Sept. 22, 1925.
R. GUDE
1,554,498
CLUTCH BETWEEN TRACTOR TRUCK AND TRAILER
Filed April 22, 1925
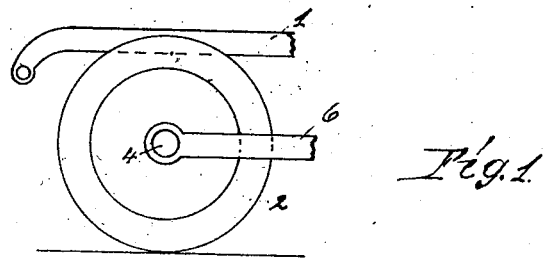
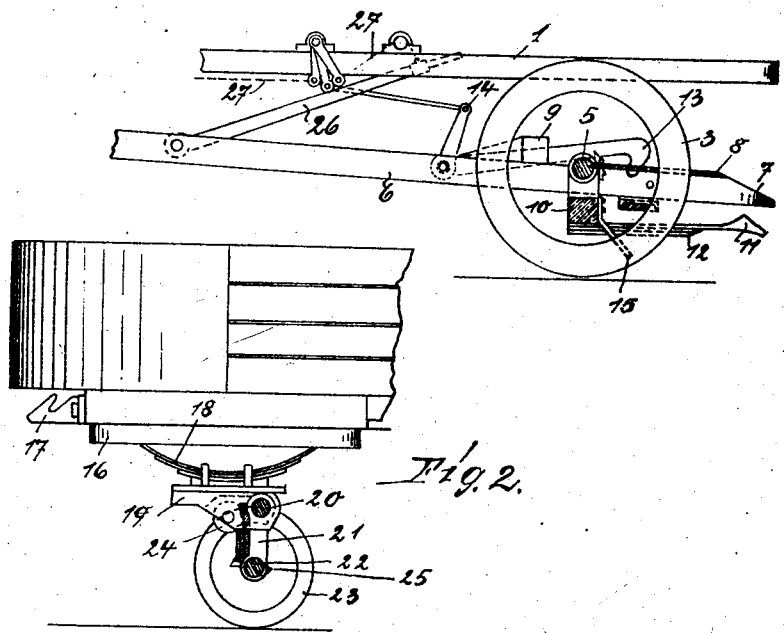
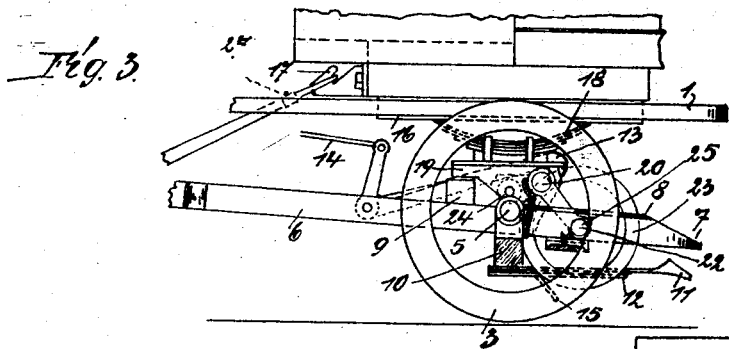
Inventor:
Robert Gude Patented Sept. 22, 1925.

1,554,498

UNITED STATES PATENT OFFICE.

ROBERT GUDE, OF DRESDEN, GERMANY.

CLUTCH BETWEEN TRACTOR TRUCK AND TRAILER.

Application filed April 22, 1925. Serial No. 25,158.

*To all whom it may concern:*

Be it known that I, ROBERT GUDE, a citizen of the German Republic, residing at Dresden-A., Berggiesshüblerstr. 1, Germany, have invented certain new and useful Improvements in Clutches between Tractor Trucks and Trailers, of which the following is a specification.

The invention relates to a new clutch between tractor truck and trailer, and its chief characteristic feature lies in the fact that the tractor truck is equipped with two obliquely arranged rails running from the front to the rear axle and forming a slideway for the accommodation of the trailer when the truck backs up while, at the same time, the locking device of the tiltable wheel frame of the trailer is released so as to cause the wheel frame to tilt and permit the front bearing of the trailer to rest on the rails. Up to a certain length the rails are preferably provided with platforms upon which the trailer moves by means of rolls until it reaches the front end of the rails and its supporting block carried by the latter. Owing to the arrangement of the rails on the front and rear axle the load of the trailer acting in a vertical direction is put on the rear axle. When the trailer strikes the rails of the tractor truck stops provided on the tractor will, at the same time, cause the wheel frame of the trailer to tilt over. Coupling between trailer and tractor truck takes place at the end of the rails in a twofold manner, viz. by means of a pawl of the tractor placing itself behind the tilting axle and furthermore, by means of a clamp occupying a position behind a clutch hook of the front pivoted bogie of the trailer. During the uncoupling process these locking devices are released by means of a draw gear, while simultaneously, a stop provided with springs and attached to the tractor truck causes the tilting frame of the trailer to straighten up.

One form of the invention is illustrated in the accompanying drawing, in which

Figure 1 is a side view of the tractor truck;

Fig. 2, a side view of the trailer; and

Fig. 3, a view of trailer and tractor when coupled (partly shown).

1 is the frame of the tractor with front wheels 2 and rear wheels 3. From the front axle 4 to the rear axle 5 two rails 6 runs in oblique direction so as to form a slideway; on their rear end the rails are provided with a slanting ramp 7. Up to a certain length the rails carry a platform 8 while at a certain distance behind the end of the platform 8 a bearing 9 has been arranged across the rails. By means of a drop hanger bearing 10 a hook 11 provided with springs 12 has been arranged on the rear axle. 13 is a pawl which can be lifted by a drawing device 14. 15 are obliquely arranged stops which are also attached to the drop hanger bearing 10. The front end of the trailer is equipped with a pivoted bogie 16 and hook 17. By means of the springs 18 the bogie is provided with a tilting contrivance comprising the bearing 19, the tilting shaft 20, the tilting arm 21, shaft 22 and wheels 23. Below the bearing block rolls 24 have been arranged, and the arm 21 is provided with a nose 25 cooperating with the pawl 11. Furthermore, a clamp 26 has been arranged at the tractor and can be operated by means of a drawing device 27 simultaneously with the drawing device 14. The clamp 26 cooperates with the hook 17 of the trailer.

The function is as follows: when trailer and tractor are to be coupled the tractor slowly backs up so that the rolls 24 of the trailer run on the slanting ramp 7 of the rails 6 of the tractor. The front part of the trailer is thus lifted out, and the rolls 24 gradually reach the platform 8, which they leave again at its end to return to the rails while the front part of the trailer is slightly lowered. At the same time, the bearing 19 rests on bearing 9 while, in the meantime, stops 15 have caused the tilting frame of the trailer to tip up after the wheels 23 struck these stops. Tilting takes place around the tilting shaft 20. If the trailer has properly engaged the rails, the hooks 13 will finally place themselves behind the tilting shaft 20, and the clamp 26 will occupy a position behind the hook 17 of the bogie 16, so that the coupling is doubly secured. To uncouple, pawls 13 and clamp 26 are lifted by means of the drawing devices 14 and 27, respectively, the tractor starts slowly to move, and the rolls 24 run again over the platform 8 so that the trailer is slightly lifted and the bearing 19 becomes separated from bearing 9. The rolls 24 finally run down over the platforms 8 and the slanting ramps 7 while the tilting device, by its own weight, occupies again an almost vertical position, which is made absolutely vertical by the action of the hooks 11 in engaging the nose 25 and exercising pressure upon the tilting device. The vertical position of the tilting device is secured by a special locking contrivance not specified here. Finally, the hooks 11 move underneath the lower end of arms 21, and the clutch is perfectly released.

I claim:—

1. A clutch between tractor truck and trailer characterized by the fact that the rails, up to a certain length, are provided with platforms upon which the trailer moves until it reaches the end of the rails and is lowered to rest on the supporting blocks carried by the rails.

2. A clutch between tractor truck and trailer characterized by the fact that the rails are provided with platforms over which the rolls of the trailer move so that the front part of the trailer is lifted and its front bearing finally placed on special bearings arranged on the rails while, simultaneously, stops provided on the tractor cause the tilting of the tilting frame of the trailer.

3. A clutch between tractor truck and trailer characterized by the fact that the coupling of the tractor and trailer is effected by means of a pawl of the tractor placing itself behind the tilting shaft and by means of a clamp occupying a position behind a clutch hook of the front pivoted bogie of the trailer.

4. A clutch between tractor truck and trailer characterized by the fact that during the uncoupling process the locking devices are released by a drawing device while, simultaneously, a stop provided with springs and attached to the tractor truck causes the tilting frame to straighten up completely.

In testimony whereof I have affixed my signature.

ROBERT GUDE.